(12) United States Patent
Yoshino et al.

(10) Patent No.: US 8,482,631 B2
(45) Date of Patent: Jul. 9, 2013

(54) IMAGE PROCESSING APPARATUS, CAMERA MODULE AND ELECTRONIC DEVICE

(75) Inventors: Akira Yoshino, Tokyo (JP); Keiichiro Yanagida, Tokyo (JP); Teppei Nakano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 324 days.

(21) Appl. No.: 13/049,466

(22) Filed: Mar. 16, 2011

(65) Prior Publication Data

US 2011/0273583 A1 Nov. 10, 2011

(30) Foreign Application Priority Data

May 7, 2010 (JP) .................. 2010-107151

(51) Int. Cl.
*H04N 9/73* (2006.01)
(52) U.S. Cl.
USPC ........................................... 348/223.1
(58) Field of Classification Search
USPC .................. 348/223.1, 225.1, 222.1, 207.99, 348/242
See application file for complete search history.

(56) References Cited

U.S. PATENT DOCUMENTS

| | | | | |
|---|---|---|---|---|
| 6,788,339 B1 * | 9/2004 | Ikeda | ................ | 348/223.1 |
| 7,864,222 B2 | 1/2011 | Yoshino et al. | | |
| 2004/0197022 A1 * | 10/2004 | Gonsalves | ................ | 382/167 |
| 2007/0064118 A1 * | 3/2007 | Mishina | ................ | 348/222.1 |

FOREIGN PATENT DOCUMENTS

| | | |
|---|---|---|
| JP | 2000-69488 A | 3/2000 |
| JP | 2008-109468 A | 5/2008 |
| JP | 2009-17591 A | 1/2009 |

\* cited by examiner

*Primary Examiner* — Nicholas Giles
(74) *Attorney, Agent, or Firm* — Oblon, Spivak, McClelland, Maier & Neustadt, L.L.P.

(57) ABSTRACT

According to one embodiment, a false color mask signal generation circuit generates a false color pixel mask signal to exclude false color component pixels based on an edge component signal from an edge component extraction circuit. A white balance gain calculation circuit calculates a white balance gain from an integrated value calculated by the false color component pixels being excluded based on the false color pixel mask signal.

15 Claims, 5 Drawing Sheets

IMAGE PROCESSING APPARATUS, CAMERA MODULE AND ELECTRONIC DEVICE

CROSS-REFERENCE TO RELATED APPLICATIONS

This application is based upon and claims the benefit of priority from the prior Japanese Patent Application No. 2010-107151, filed on May 7, 2010; the entire contents of all of which are incorporated herein by reference.

FIELD

Embodiments described herein relate generally to an image processing apparatus, a camera module, and an electronic device.

BACKGROUND

Camera modules (imaging apparatuses) that make white balance adjustments in accordance with a color temperature of a light source have been widely used. Without white balance adjustments, for example, an object under a fluorescent lamp may be taken in a greenish state or an object under an incandescent lamp may be taken in a reddish state. A camera module attempts to take a white portion of an object in a white state close to nature through white balance adjustments. An automatic white balance control (AWB) system is a system that automatically makes white balance adjustments.

The AWB system sets a color temperature range in which the white balance should be judged to a color judgment gate. By setting the range tinged with a color by light from a light source, though originally achromatic, for white balance adjustments, the color judgment gate can distinguish between an originally achromatic portion and a chromatic portion regardless of the color temperature of the light source. The AWB system integrates a signal level of pixels sorted by the color judgment gate for one frame and dividing the integrated value by the sorted number of pixels to calculate an average value per pixel in the frame. If the integrated data is a color difference signal, the AWB system adjusts the white balance so that the signal level of pixels sorted by the color judgment gate becomes zero.

A camera module using a single image sensor may cause a phenomenon in which a color that is originally not present appears, that is, a false color viewed in the light of the structure of the image sensor. The image sensor does not identify the color itself and thus picks up the additive primaries (or the subtractive primaries) by color separation using a color filter. If the color is not separated and not recognized correctly, a false color is generated in principle. A false color is more likely to appear particularly in an edge portion, color boundaries, and boundaries of light and shade of an object image. A false color may have high saturation or may be close to achromatic and contained in a color temperature range sorted by the color judgment gate. Therefore, a conventional AWB system has a problem that the accuracy of white balance adjustments is decreased by pixels of false color components close to achromatic being included for integration targets of white balance adjustments. Particularly when an object with less achromatic portions is taken, the white balance may be adjusted to a point that significantly deviates from an ideal point by almost all pixels to be integration targets being occupied by false color components.

DETAILED DESCRIPTION

An image processing apparatus according to the embodiments includes an edge component extraction unit, a color judgment unit, an integration unit, a white balance gain calculation unit, and a false color mask signal generation unit. The edge component extraction unit extracts edge components of a picture from a picture signal to generate an edge component signal. The color judgment unit makes color judgments for each pixel to extract pixels to be integration targets to calculate a white balance gain. The integration unit integrates a signal level of pixels extracted by the color judgment unit as the integration targets. The white balance gain calculation unit calculates the white balance gain from an integrated value calculated by the integration unit. The false color mask signal generation unit generates a false color pixel mask signal to exclude false color component pixels based on the edge component signal from the edge component extraction unit. The white balance gain calculation unit calculates the white balance gain from the integrated value calculated by the false color component pixels being excluded based on the false color pixel mask signal.

Exemplary embodiments of an image processing apparatus, a camera module, and an electronic device will be explained below in detail with reference to the accompanying drawings. The present invention is not limited to the following embodiments.

Figure 1:
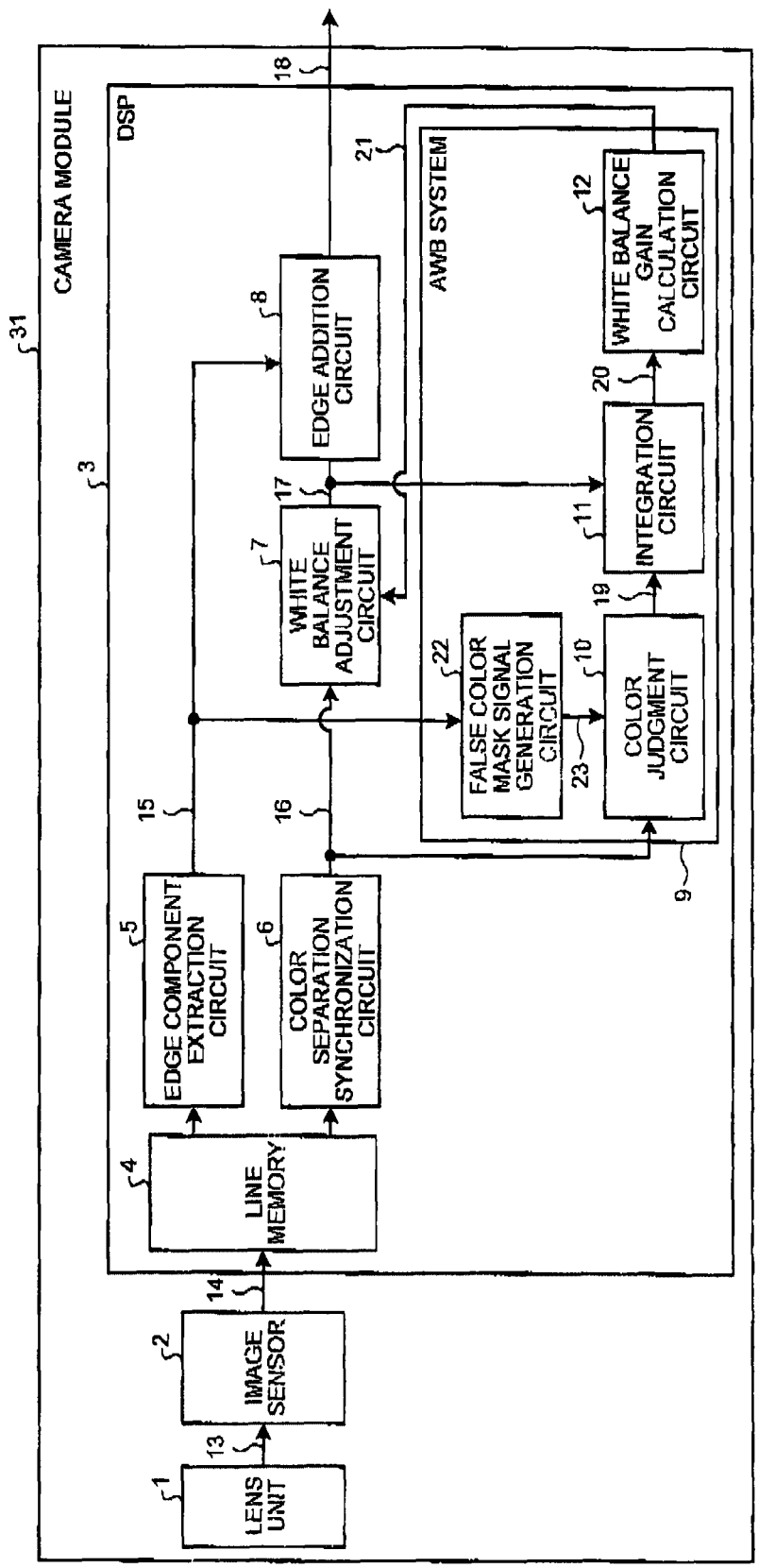
FIG. 1 is a block diagram illustrating a configuration of a camera module including an image processing apparatus according to a first embodiment.
Figure 2:
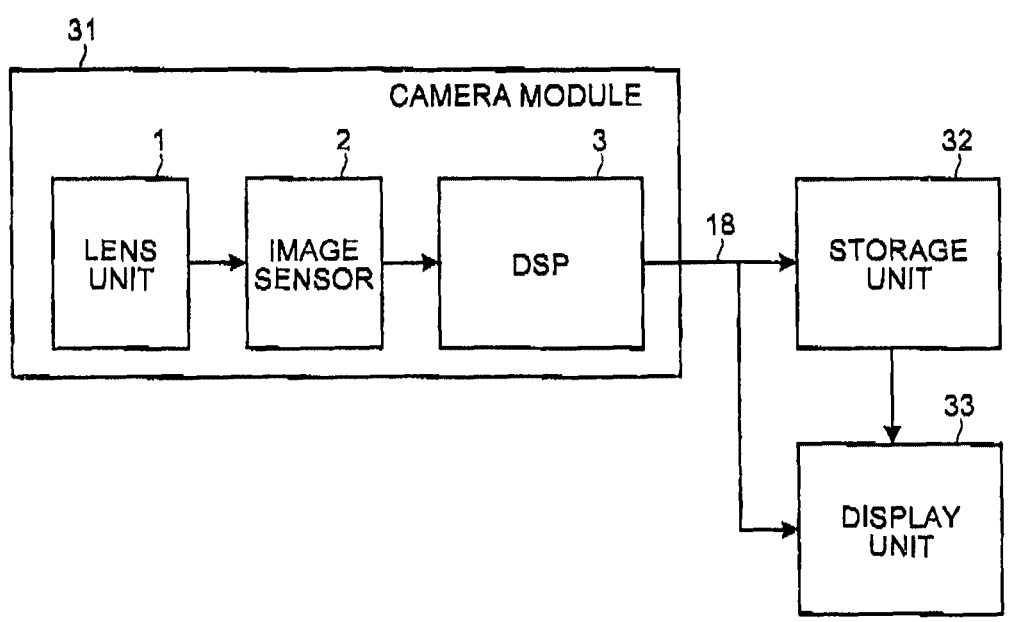
FIG. 2 is a block diagram illustrating the configuration of a digital camera, which is an electronic device including the camera module illustrated in FIG. 1.

FIG. 1 is a block diagram illustrating the configuration of a camera module according to the first embodiment. FIG. 2 is a block diagram illustrating the configuration of a digital camera, which is an electronic device including the camera module illustrated in FIG. 1.

A digital camera includes a camera module 31, a storage unit 32, and a display unit 33. A camera module 31 includes a lens unit 1, an image sensor 2, and a DSP (digital signal processing) 3, which is an image processing apparatus.

An output picture signal 18 from the camera module 31 is input into the display unit 33 or into the display unit 33 via the storage unit 32. The storage unit 32 stores images taken by the camera module 31. The display unit 33 displays an image in accordance with the output picture signal 18 from the camera module 31 or the storage unit 32. The display unit 33 is, for example, a liquid crystal display. The display unit 33 displays an image being taken in accordance with the output picture signal 18 from the camera module 31. The display unit 33 displays an image stored in the storage unit 32 in accordance with the output picture signal 18 from the storage unit 32.

The lens unit 1 includes an optical lens and an IR cut filter. The optical lens captures light from an object to form an image on the image sensor 2. The IR cut filter removes infrared light from incident light. The image sensor 2 captures an object image by converting light 13 captured by the lens unit 1 into signal charges.

The image sensor 2 has, for example, color filters for red (R), green (G), and blue (B) provided as a Bayer array. The image sensor 2 generates a picture signal (RAW data) 14 by capturing R, G, and B signals in the order corresponding to the Bayer array for each pixel.

The DSP 3 includes a line memory 4, an edge component extraction circuit (edge component extraction unit) 5, a color separation synchronization circuit 6, a white balance adjustment circuit 7, an edge addition circuit 8, and an AWB system 9. The line memory 4 temporarily stores a picture signal (RAW data) successively transmitted from the image sensor 2.

The edge component extraction circuit 5 extracts an edge component of picture from a picture signal read from the line memory 4 when appropriate to generate an edge component signal 15. The edge component extraction circuit 5 generates the edge component signal 15 by extracting a vertical edge component of picture in the vertical direction, a horizontal edge component in the horizontal direction, and an oblique edge component in an oblique direction with respect to the vertical direction and horizontal direction.

The color separation synchronization circuit 6 reads a picture signal stored in the line memory 4 when appropriate to perform color separation synchronization processing. The color separation synchronization circuit 6 calculates levels of R, G, and B components of each pixel by the color separation synchronization processing to generate an RGB picture signal 16. The white balance adjustment circuit 7 makes white balance adjustments by multiplying the RGB picture signal 16 from the color separation synchronization circuit 6 by a white balance gain 21. The white balance adjustment circuit 7 generates a white balance adjusted picture signal 17 by white balance adjustments. The edge addition circuit 8 generates an output picture signal 18 by performing edge addition processing by the edge component signal 15 on the white balance adjusted picture signal 17.

The AWB system 9 includes a color judgment circuit (color judgment unit) 10, an integration circuit (integration unit) 11, a white balance gain calculation circuit (white balance gain calculation unit) 12, and a false color mask signal generation circuit (false color mask signal generation unit) 22. The color judgment circuit 10 makes a color judgment for each pixel based on the RGB picture signal 16 from the color separation synchronization circuit 6. The color judgment circuit 10 extracts pixels in the color temperature range whose white balance should be judged as integration targets to calculate a white balance gain to generate an integration target pixel signal 19.

The false color mask signal generation circuit 22 generates a false color pixel mask signal 23 to exclude false color component pixels based on the edge component signal 15 from the edge component extraction circuit 5. The false color mask signal generation circuit 22 compares a threshold preset for edge components and the edge component signal 15 to judge pixels whose edge component signal 15 has a level deviating from the threshold as false color component pixels. False color components are to be found in portions of a picture where a false color is more likely to appear, for example, in an edge portion, color boundaries, and boundaries of light and shade of an object.

Figure 3:
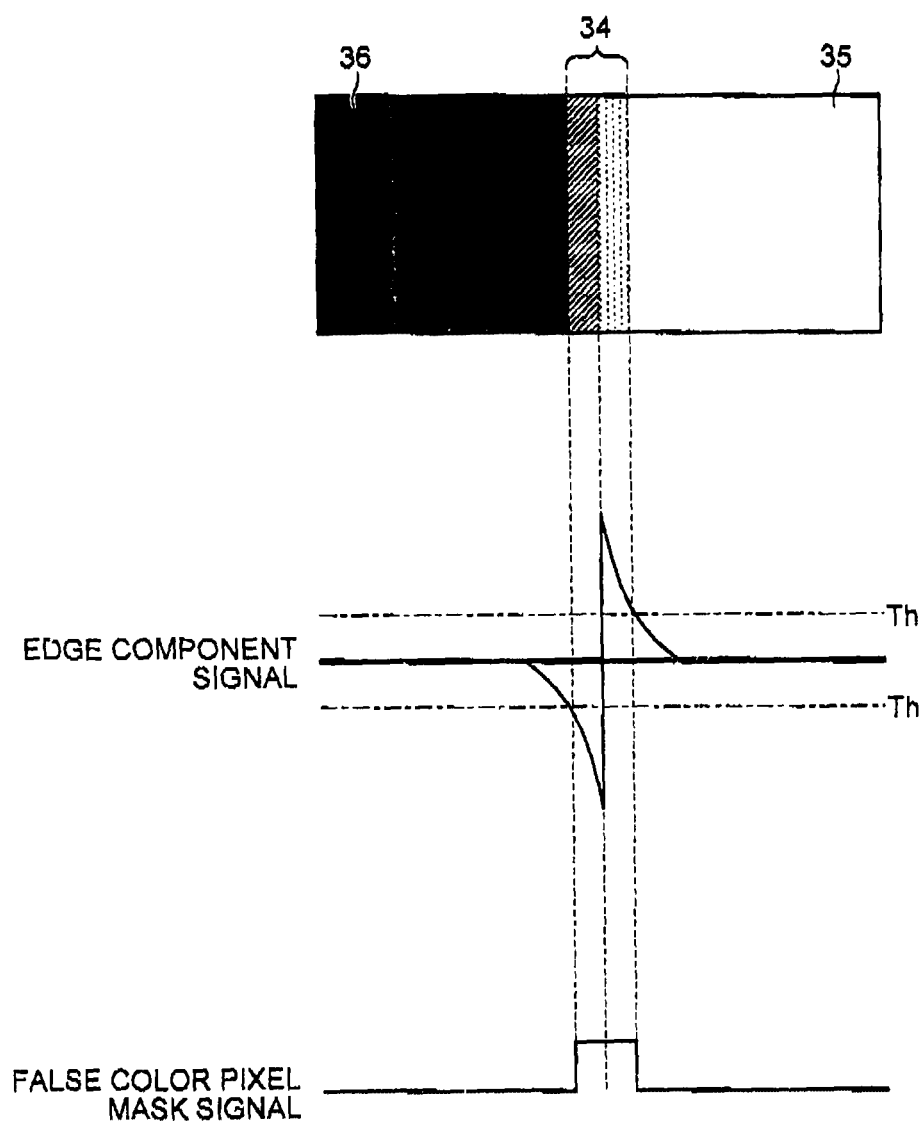
FIG. 3 is a diagram illustrating generation of a false color pixel mask signal by a false color mask signal generation circuit.

FIG. 3 is a diagram illustrating generation of a false color pixel mask signal by a false color mask signal generation circuit. If, for example, composition in which a right-side area 35 of the screen is bright and a left-side area 36 is dark is taken, the edge component extraction circuit 5 obtains the edge component signal 15 having a peak near contrast boundaries. The false color mask signal generation circuit 22 compares a preset threshold Th and the edge component signal 15 and generates the false color pixel mask signal 23 by extracting portions where the edge component signal 15 is outside the range of the threshold Th. Accordingly, the false color mask signal generation circuit 22 extracts false color component pixels 34 generated near boundaries of light and shade.

The threshold can be adjusted for each of the vertical direction component, horizontal direction component, and oblique direction component of a picture. The false color mask signal generation circuit 22 generates the false color pixel mask signal 23 based on the edge component signal 15 for each edge component in the vertical direction, horizontal direction, and oblique direction of the picture.

The threshold is to be set by, for example, a register and is adjusted when necessary by an operation from outside. The threshold may be adjusted during manufacture or when used. Regarding the vertical direction and horizontal direction, the threshold may be set for an addition result of an edge component in the vertical direction and an edge component in the horizontal direction to judge whether the component is a false component simultaneously for the vertical direction and horizontal direction.

The threshold needs to be only adjustable in at least one of the vertical direction component, horizontal direction component, and oblique direction component. In addition to being freely adjustable, the threshold may be a fixed value. The false color mask signal generation circuit 22 needs to generate the false color pixel mask signal 23 based on the edge component signal 15 of at least one of edge components in the vertical direction, horizontal direction, and oblique direction.

Figure 4:
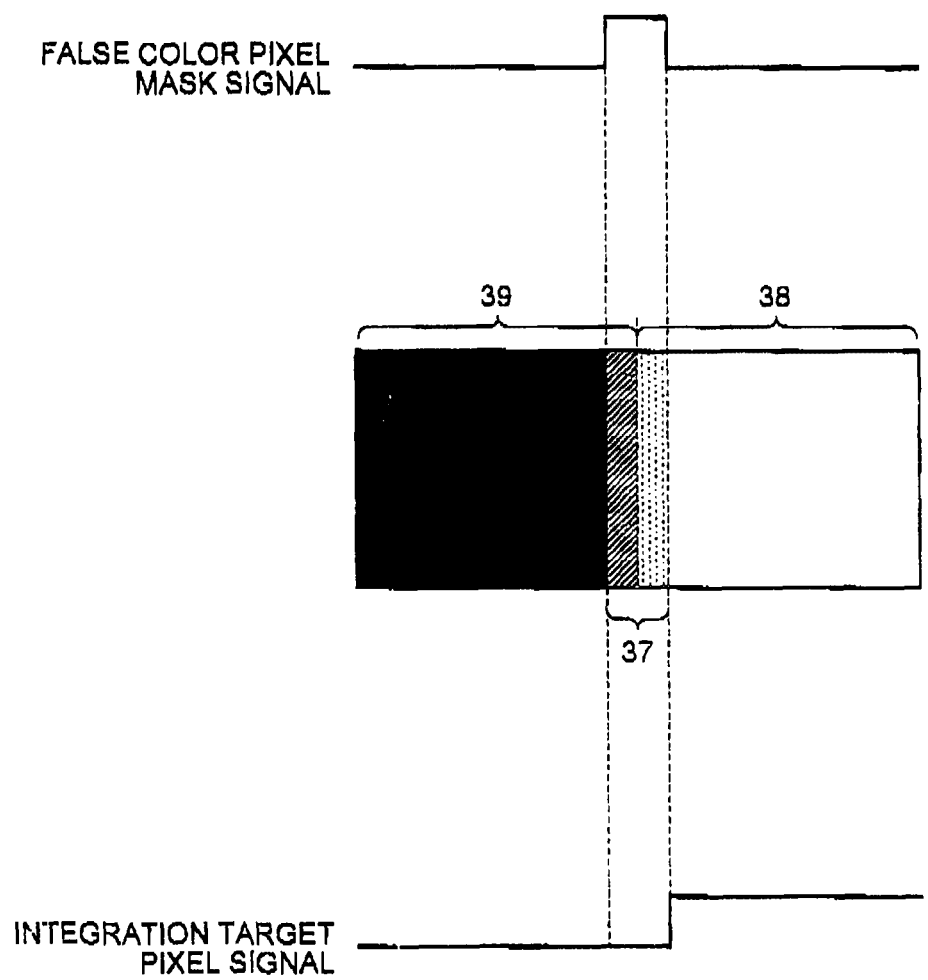
FIG. 4 is a diagram illustrating generation of an integration target pixel signal by a color judgment circuit.

FIG. 4 is a diagram illustrating generation of an integration target pixel signal by a color judgment circuit. The color judgment circuit 10 puts on a mask for color judgment over false color component pixels 37 by using the false color pixel mask signal 23 from the false color mask signal generation circuit 22. If, for example, composition in which a right-side area 38 of the screen has colors to be integration targets to calculate a white balance gain and a left-side area 39 has colors not to be integration targets, it is assumed that a false color is generated in the boundary between the right-side area 38 and the left-side area 39. The color judgment circuit 10 includes pixels in the right-side area 38 and pixels in the left-side area 39 for color judgment.

The color judgment circuit 10 excludes the false color component pixels 37 from the color judgment by a mask using the false color pixel mask signal 23. The color judgment circuit 10 generates the integration target pixel signal 19 that excludes the false color component pixels 37 from integration targets.

Thus, the color judgment circuit 10 makes color judgments by excluding the false color component pixels 37 in accordance with the false color pixel mask signal 23 from the false color mask signal generation circuit 22. Accordingly, the color judgment circuit 10 excludes pixels of the false color component pixels 37 that fall within the color temperature range to be targets for white balance judgment from pixels to be integration targets. The integration circuit 11 integrates the signal level of pixels corresponding to integration targets of the white balance adjusted picture signal 17 based on the integration target pixel signal 19 from the color judgment circuit 10. The integration circuit 11 calculates an integrated value 20 by integrating the signal level of pixels corresponding to integration targets for one frame.

The white balance gain calculation circuit 12 calculates the white balance gain 21 from the integrated value 20 calculated by the integration circuit 11. According to the above procedure, the white balance gain calculation circuit 12 calculates the white balance gain 21 from the integrated value 20 calculated by false color component pixels being excluded based on the false color pixel mask signal 23. The DSP 3 reflects the white balance gain 21 calculated by the white balance gain calculation circuit 12 in the RGB picture signal 16 of the next frame.

The DSP 3 improves the accuracy of white balance adjustments by relatively simple processing of removing portions where false color is more likely to appear from white balance judgment targets based on the edge components. By adopting the configuration in which edge components are extracted by the generally provided edge component extraction circuit 5 and generating the false color pixel mask signal 23 based on the edge components, the DSP 3 can easily improve AWB performance by hardly increasing the circuit scale. If, for example, the RGB picture signal 16 and the false color pixel mask signal 23 are roughly in the same timing, adjustments of a delay difference in the color judgment circuit 10 can be made unnecessary by excluding false color component pixels by the color judgment circuit 10.

Figure 5:
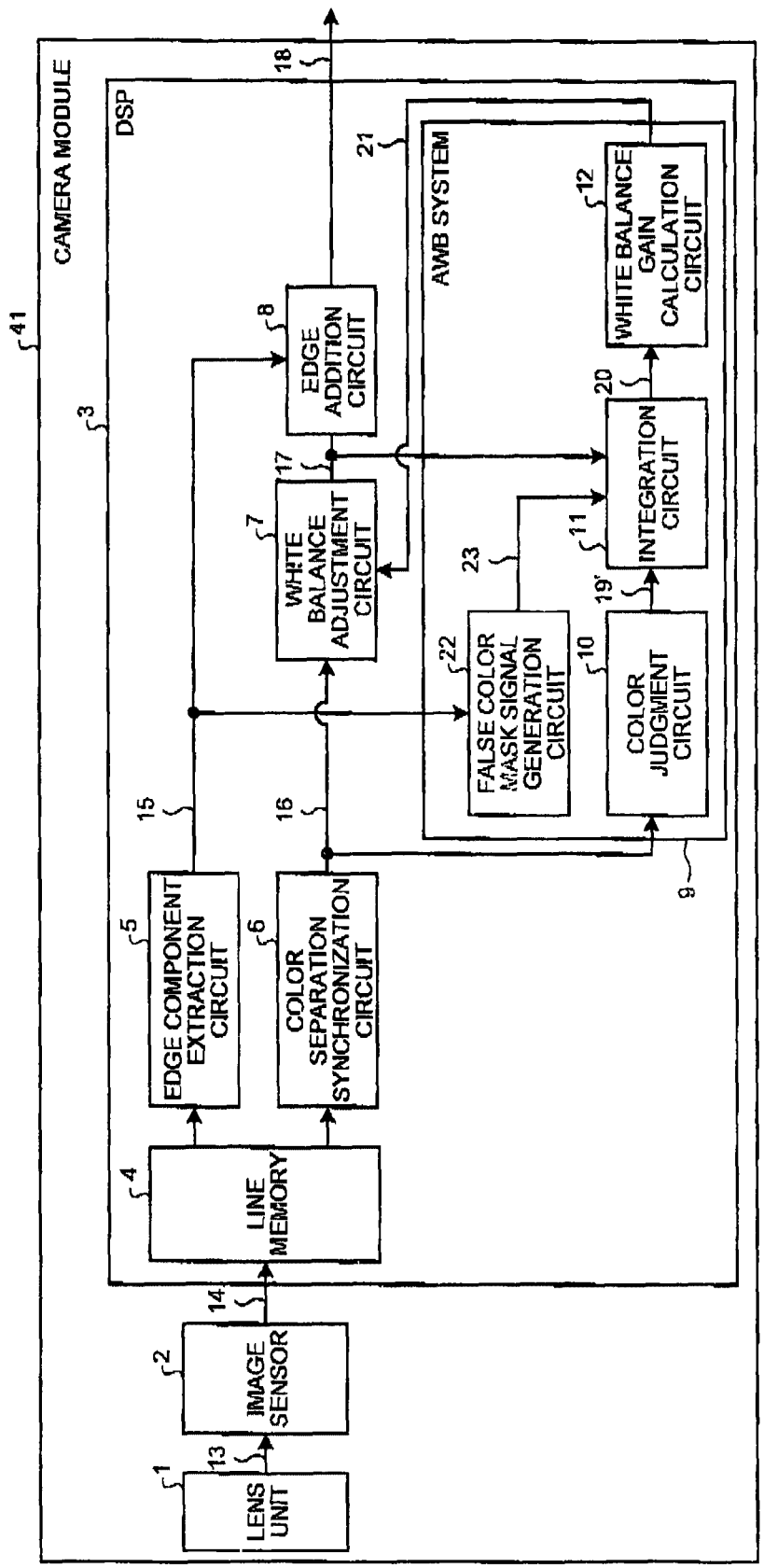
FIG. 5 is a block diagram illustrating the configuration of a camera module including the image processing apparatus according to a second embodiment.

FIG. 5 is a block diagram illustrating the configuration of a camera module according to the second embodiment. In a camera module 41 according to the present embodiment, the integration circuit 11 excludes false color component pixels in accordance with the false color pixel mask signal 23. The same reference numerals are attached to the same portions as those in the first embodiment and a duplicate description is omitted.

The color judgment circuit 10 generates an integration target pixel signal 19' before pixels of false color component pixels that fall within the color temperature range to be targets for white balance judgment are excluded from integration targets. The integration circuit 11 calculates the integrated value 20 by excluding false color component pixels in accordance with the false color pixel mask signal 23 from pixels to be integration targets based on the integration target pixel signal 19'.

Accordingly, the white balance gain calculation circuit 12 calculates the white balance gain 21 from the integrated value 20 calculated by false color component pixels being excluded based on the false color pixel mask signal 23. The DSP 3 in the present embodiment can also improve the accuracy of white balance adjustments. If, for example, the false color pixel mask signal 23 is delayed with respect to the RGB picture signal 16, the delay difference of the false color pixel mask signal 23 with respect to the integration target pixel signal 19' can be reduced in the integration circuit 11 by performing color judgment processing by the color judgment circuit 10 before false color component pixels being removed so that the processing speed of the whole DSP 3 can be increased.

Therefore, according to the first and second embodiments, an effect of being able to make high-accuracy white balance adjustments is achieved. An image processing apparatus according to the first and second embodiments may be applied to other electronic devices than digital cameras such as mobile phones with a camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus, comprising:
an edge component extraction unit that extracts edge components of a picture from a picture signal to generate an edge component signal;
a color judgment unit that makes color judgments for each pixel to extract pixels to be integration targets to calculate a white balance gain;
an integration unit that integrates a signal level of pixels extracted by the color judgment unit as the integration targets;
a white balance gain calculation unit that calculates the white balance gain from an integrated value calculated by the integration unit; and
a false color mask signal generation unit that generates a false color pixel mask signal to exclude false color component pixels based on the edge component signal from the edge component extraction unit, wherein
the white balance gain calculation unit calculates the white balance gain from the integrated value calculated by the false color component pixels being excluded based on the false color pixel mask signal.

2. The image processing apparatus according to claim 1, wherein the color judgment unit makes the color judgment by excluding the false color component pixels in accordance with the false color pixel mask signal.

3. The image processing apparatus according to claim 1, wherein the integration unit calculates the integrated value by excluding the false color component pixels in accordance with the false color pixel mask signal from pixels extracted as the integration targets by the color judgment unit.

4. The image processing apparatus according to claim 1, wherein the false color mask signal generation unit judges that pixels whose edge component signal has a level deviating from a threshold as the false color component pixels by comparing the threshold set for the edge components and the edge component signal.

5. The image processing apparatus according to claim 1, wherein the false color mask signal generation unit generates the false color pixel mask signal based on the edge component signal of at least one of edge components in a vertical direction, a horizontal direction, and an oblique direction with respect to the vertical direction and the horizontal direction of the picture.

6. A camera module, comprising:
a lens unit that captures light from an object;
an image sensor that generates a picture signal by converting the light captured by the lens unit into signal charges; and
an image processing apparatus that performs image processing on the picture signal from the image sensor, wherein
the image processing apparatus, comprising:
an edge component extraction unit that extracts edge components of a picture from the picture signal to generate an edge component signal;
a color judgment unit that makes color judgments for each pixel to extract pixels to be integration targets to calculate a white balance gain;
an integration unit that integrates a signal level of pixels extracted by the color judgment unit as the integration targets;
a white balance gain calculation unit that calculates the white balance gain from an integrated value calculated by the integration unit; and
a false color mask signal generation unit that generates a false color pixel mask signal to exclude false color component pixels based on the edge component signal from the edge component extraction unit, wherein the white balance gain calculation unit calculates the white balance gain from the integrated value calculated by the false color component pixels being excluded based on the false color pixel mask signal.

7. The camera module according to claim 6, wherein the color judgment unit makes the color judgment by excluding the false color component pixels in accordance with the false color pixel mask signal.

8. The camera module according to claim 6, wherein the integration unit calculates the integrated value by excluding the false color component pixels in accordance with the false color pixel mask signal from pixels extracted as the integration targets by the color judgment unit.

9. The camera module according to claim 6, wherein the false color mask signal generation unit judges that pixels whose edge component signal has a level deviating from a threshold as the false color component pixels by comparing the threshold set for the edge components and the edge component signal.

10. The camera module according to claim 6, wherein the false color mask signal generation unit generates the false color pixel mask signal based on the edge component signal of at least one of edge components in a vertical direction, a horizontal direction, and an oblique direction with respect to the vertical direction and the horizontal direction of the picture.

11. An electronic device, comprising:
a camera module including an image processing apparatus that performs image processing on a picture signal generated by converting light from an object into signal charges; and
a display unit that displays an image that has undergone the image processing by the image processing apparatus, wherein
the image processing apparatus, comprising:
an edge component extraction unit that extracts edge components of a picture from the picture signal to generate an edge component signal;
a color judgment unit that makes color judgments for each pixel to extract pixels to be integration targets to calculate a white balance gain;
an integration unit that integrates a signal level of pixels extracted by the color judgment unit as the integration targets;
a white balance gain calculation unit that calculates the white balance gain from an integrated value calculated by the integration unit; and
a false color mask signal generation unit that generates a false color pixel mask signal to exclude false color component pixels based on the edge component signal from the edge component extraction unit, wherein
the white balance gain calculation unit calculates the white balance gain from the integrated value calculated by the false color component pixels being excluded based on the false color pixel mask signal.

12. The electronic device according to claim 11, wherein the color judgment unit makes the color judgment by excluding the false color component pixels in accordance with the false color pixel mask signal.

13. The electronic device according to claim 11, wherein the integration unit calculates the integrated value by excluding the false color component pixels in accordance with the false color pixel mask signal from pixels extracted as the integration targets by the color judgment unit.

14. The electronic device according to claim 11, wherein the false color mask signal generation unit judges that pixels whose edge component signal has a level deviating from a threshold as the false color component pixels by comparing the threshold set for the edge components and the edge component signal.

15. The electronic device according to claim 11, wherein the false color mask signal generation unit generates the false color pixel mask signal based on the edge component signal of at least one of edge components in a vertical direction, a horizontal direction, and an oblique direction with respect to the vertical direction and the horizontal direction of the picture.

* * * * *